United States Patent

Shimizu et al.

[11] Patent Number: 6,156,453
[45] Date of Patent: Dec. 5, 2000

[54] WATER-REPELLING AGENT FOR BATTERIES AND BATTERY

[75] Inventors: Tetsuo Shimizu; Yoshihide Higashihata; Takayuki Nakamura, all of Settsu, Japan

[73] Assignee: Daikin Industries, Ltd., Osaka, Japan

[21] Appl. No.: 08/930,542

[22] PCT Filed: Apr. 5, 1996

[86] PCT No.: PCT/JP96/00953

§ 371 Date: Oct. 1, 1997

§ 102(e) Date: Oct. 1, 1997

[87] PCT Pub. No.: WO96/32751

PCT Pub. Date: Oct. 17, 1996

[30] Foreign Application Priority Data

Apr. 10, 1995 [JP] Japan ................................. 7-084259
Dec. 15, 1995 [JP] Japan ................................. 7-327269

[51] Int. Cl.[7] .................................................. H01M 4/607
[52] U.S. Cl. ......................... 429/212; 429/215; 429/217; 429/223
[58] Field of Search ............................. 429/212, 215, 429/218.2, 217, 223

[56] References Cited

U.S. PATENT DOCUMENTS

| 3,956,000 | 5/1976 | Kuhls et al. | 106/270 |
| 4,134,204 | 1/1979 | Fang | 428/413 |
| 5,324,785 | 6/1994 | Noda et al. | 525/276 |
| 5,654,115 | 8/1997 | Hasebe et al. | 429/218 |

FOREIGN PATENT DOCUMENTS

| 0 483 760 A2 | 5/1992 | European Pat. Off. | C09D 127/12 |
| 0 735 093 A1 | 10/1996 | European Pat. Off. | |
| 0735093 | 10/1996 | European Pat. Off. | C08L 27/00 |
| 63-128556 | 6/1988 | Japan | |
| 5-275076 | 10/1993 | Japan | |

OTHER PUBLICATIONS

Patent Abstracts of Japan vol. 009, No. 284, Publ. Date Nov. 12, 1985 (Abstract of JP No. 60–127661A, Publ. Date: Jul. 8, 1985).

Patent Abstracts of Japan vol. 004, No. 028, Publ. Date Mar. 8, 1980 (Abstract of JP No. 55–003121 A, Publ. Date Jan. 10, 1980).

Patent Abstracts of Japan vol. 017, No. 698, Publ. Date Dec. 20, 1993 (Abstract of JP No. 05–242908 A, Publ. Date Sept. 21, 1993).

*Primary Examiner*—Maria Nuzzolillo
*Assistant Examiner*—Angela J. Martin
*Attorney, Agent, or Firm*—Kubovcik & Kubovcik

[57] ABSTRACT

To provide a water-repelling agent for batteries which comprises an aqueous dispersion or organosol containing fine particles having an average particle size of from 0.05 to 1 μm and made of a tetrafluoroethylene-perfluoro(alkyl vinyl ether) copolymer and/or a non-fibril-forming tetrafluoroethylene polymer, is obtained without use of a powder of a fluorine-containing resin as it is, can enhance chemical resistance, heat resistance and water repellency particularly more effectively without being fibrillated even if mixed with electrode materials and is excellent in workability, and to provide a battery which is produced by using the water-repelling agent for batteries and is excellent in cycle life and internal pressure characteristics.

9 Claims, 1 Drawing Sheet

WATER-REPELLING AGENT FOR BATTERIES AND BATTERY

TECHNICAL FIELD

The present invention relates to a water-repelling agent for batteries and a battery produced by using the water-repelling agent.

BACKGROUND ART

Recently demand for precise electric and electronic apparatuses which are small-sized and portable, such as audio tape recorder, camera built-up video tape recorder, personal computer and portable phone has been increasing more and more. As a result of such an increased demand, there has come to be required so-called secondary battery which is light and rechargeable, provides power source for driving those apparatuses and has high energy density. New secondary batteries of nickel-metal hydride type and lithium type have been commercialized by turns in addition to conventional lead storage batteries and nickel-cadmium secondary batteries.

A factor which greatly influences performance of those batteries is an active material for a battery (hereinafter referred to simply as "active material") among materials for positive and negative electrodes of a battery. Examples of the active material for positive electrode are, for instance, manganese dioxide ($MnO_2$), nickel hydroxide ($Ni(OH)_2$), lithium cobalt dioxide ($LiCoO_2$), lithium nickel dioxide ($LiNiO_2$), vanadium pentoxide ($V_2O_5$), niobium pentoxide ($Nb_2O_5$), lithium manganese dioxide ($LiMnO_2$) and the like, and examples of the active material for negative electrode are, for instance, cadmium hydroxide ($Cd(OH)_2$), hydrogen storage alloy (M—H), carbonaceous materials (natural graphite, artificial graphite, coke, etc.) and the like.

When producing a battery, those active materials are bound to electroconductive carbonaceous materials, for example, carbon blacks such as acetylene black and Ketjen black and graphites to produce an electrode. In such a case, fluorine-containing resins being excellent in chemical resistance and heat resistance and having binding property have been used widely as a suitable binder.

Among the above-mentioned fluorine-containing resins, as an example of use of polytetrafluoroethylene as a binder, for instance, JP-A-63-236258 discloses use of a dispersion of high molecular weight polytetrafluoroethylene (PTFE) (homopolymer) for binding $MnO_2$ which is the active material for positive electrode of lithium primary battery with an electroconductive carbonaceous material such as acetylene black or graphite. JP-B-6-10980 discloses use of a dispersion of high molecular weight PTFE (homopolymer) for binding manganese oxide which is the active material for positive electrode of air-zinc battery with carbon black and activated carbon which are electroconductive carbonaceous materials.

On the other hand, there is known a disclosure of use of poly(vinylidene fluoride) (PVDF) as a binder. For example, JP-A-6-44964 discloses an electrode of a nickel-metal hydride secondary battery which is produced by mixing hydrogen storage alloy and carbonyl-nickel powder which are the active materials with a PVDF solution and molding the mixture into a sheet.

As a property for evaluating performance of such secondary batteries, there is used a cycle life. In secondary batteries employing nickel compound as the active material for positive electrode, particularly a nickel-metal hydride secondary battery, at the time of over-charging or rapid charging by large current, oxygen gas is generated from the positive electrode and an internal pressure of the battery increases. This is the main cause for shortening the cycle life. Namely, when the internal pressure of the battery increases over a certain level and a safety valve mounted is actuated, an aqueous solution of electrolyte and oxygen gas are released outside the battery to lower discharge capacity and cause leakage of the solution, which results in a problem of shortening of battery life.

To solve the mentioned problem, there is a method to diffuse the generated gas quickly and accelerate a reaction for converting the generated gas to water, an oxide or a hydroxide. As means therefor, there have been already practically employed a method wherein a balance of capacity of the positive electrode and negative electrode is adjusted to increase the capacity of the negative electrode and a method wherein a carbon supporting reduction catalyst is added to the negative electrode. Another method is such that since the reaction for diffusing the generated gas quickly to convert it to water, oxide or hydroxide occurs on an interface of three-phase (gas phase-liquid phase-solid phase) within the electrodes, such an interface is allowed to be present finely, closely and uniformly inside the electrodes (particularly negative electrode) or on the surface thereof.

In the nickel-metal hydride secondary battery, a fluorine-containing resin is used because it easily forms the interface of three-phase and has a low surface energy and excellent water repellency, and thus not only a function of binding property but also a function of water repellency are utilized.

Also a reaction mechanism of the fuel cell is such that the reaction positively occurs on the interface of three-phase of fuel gas, electrolyte and catalyst, and the fluorine-containing resin used therefor plays the both roles of binding and water repellency.

Among the fluorine-containing resins, particularly PTFE which is prepared by emulsion polymerization has a characteristic of being easily fibrillated by a small compressive shear force unless previously heat-treated at a temperature of not less than its melting point. Therefore, if PTFE is mixed with other materials, fibrils are easily produced and exhibits a function of binding them, namely binding property. The reason why the fluorine-containing resin, particularly PTFE is used as the binder for the electrode of the battery lies in such a binding property and very excellent chemical resistance and heat resistance, and thus used in various primary and secondary baterries (for example, air-zinc primary battery, alkali-manganese primary battery, lithium primary battery, nickel-cadmium secondary battery, nickel-metal hydride secondary battery, lithium ion secondary battery and the like). However, in the nickel-cadmium secondary battery, nickel-metal hydride secondary battery or fuel cell which requires water repellency as well as binding property, a small amount of PTFE suffices for fibrillation, but in order to endow the electrode with water repellency closely and uniformly, it is necessary to use PTFE in an amount of not less than required amount for binding. When water repellency is enhanced by increasing an amount of PTFE, some difficulties arise usually. For example, since fibrillation is easy to occur, it is substantially difficult to mix PTFE uniformly with other liquid or powder materials and there is a case where water repellency cannot be always uniformly given to the electrode. Further, the active material must be decreased in an amount corresponding to the increased amount of PTFE. Either case result in impairing of electrode characteristics or battery performance. An average molecular weight of the PTFE is over 1,300,000 up to 10,000,000.

Any of PTFE homopolymer and modified PTFE may be used if they are fibrillated.

Under the background mentioned above, there is proposed use of relatively low molecular weight PTFE (homopolymer) to prevent the fibrillation. For example, it is recommended in JP-A-5-242908 to use a fluorine-containing resin powder having an average molecular weight of not more than 3,000,000, concretely a low molecular weight PTFE (homopolymer) and tetrafluoroethylene-hexafluoropropylene copolymer (hereinafter referred to as "FEP"). However, the fluorine-containing resin disclosed in the above-mentioned patent publication is in the form of powder, and it is usually difficult to mix the resin to an active material of batteries and coat it to the electrode uniformly. Furthermore, in case of the PTFE (homopolymer) having the average molecular weight of around 3,000,000, the fibrillation is generated to a certain extent, and such an average molecular weight is insufficient for exhibiting an effect which the above patent publication aimed at.

An object of the present invention is to provide a water-repelling agent for batteries, which can be obtained without using a fluorine-containing resin powder as it is, causes no fibrillation even if mixed with the electrode materials, can enhance chemical resistance, heat resistance and particularly water repellency more effectively and is excellent in workability, and also to provide a battery which is produced by using the water-repelling agent and is excellent in cycle life and internal pressure characteristics.

DISCLOSURE OF THE INVENTION

The present invention relates to a water-repelling agent for batteries comprising an aqueous dispersion or organosol containing fine particles which have an average particle size of 0.05 to 1 μm and are made of tetrafluoroethylene-perfluoro(alkyl vinyl ether) copolymer (hereinafter also referred to as "PFA") and/or a non-fibril-forming tetrafluoroethylene (hereinafter also referred to as "TFE") polymer.

Further, the present invention relates to a battery produced by using the above-mentioned water-repelling agent for batteries.

BEST MODE FOR CARRYING OUT THE INVENTION

Figure 1:
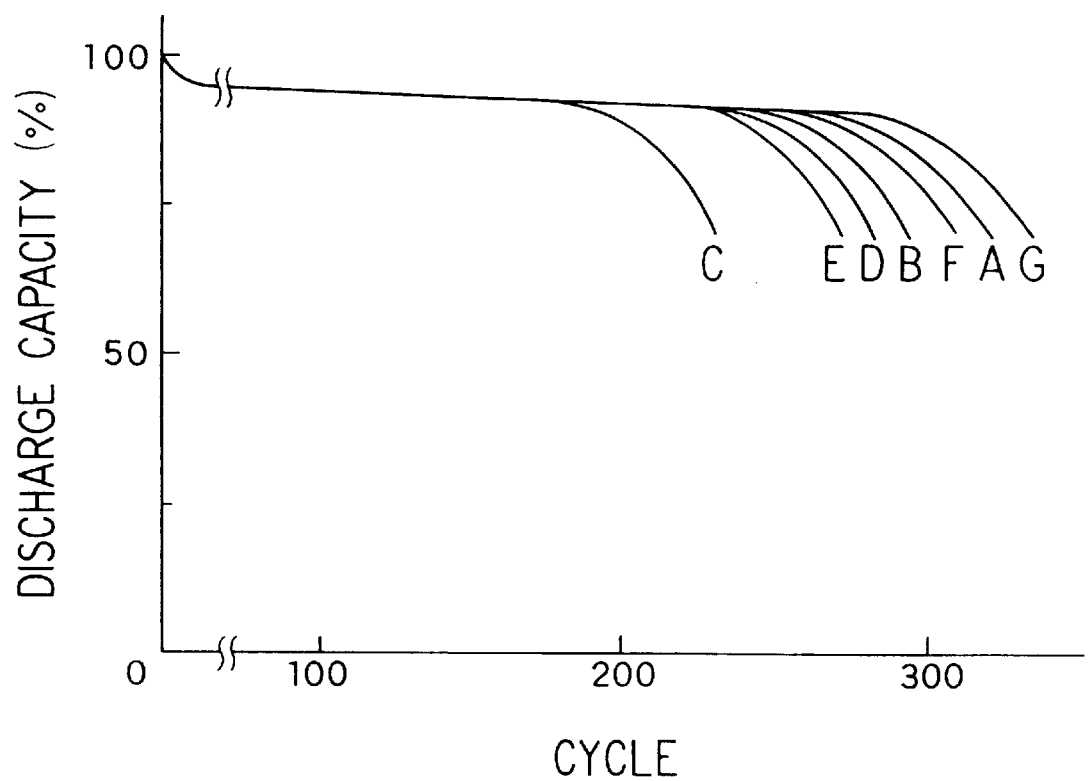
FIG. 1 is a graph explaining cycle characteristics of discharge capacity of the battery of the present invention.

The present inventors have found that by using PFA and/or non-fibril-forming TFE polymer, fibrillation does not occur even in case of mixing with electrode materials and also by using an aqueous dispersion or organosol containing fine particles of PFA and/or non-fibril-forming TFE polymer, the mixing with the electrode materials and coating to the electrode can be carried out uniformly, thereby a higher water repellency can be obtained, and thus the above-mentioned problems could be solved.

In the electrode materials for batteries which require binding property and water repellency, a fibril-forming high molecular weight PTFE (both of PTFE homopolymer and modified PTFE suffice if fibrillated) which has been used heretofore can satisfy the binding requirement.

Namely, in the present invention, it is presumed that excellent water repellency can be obtained since fine particles of the PFA and/or non-fibril-forming TFE polymer are dispersed uniformly and closely, for example, inside the electrode (particularly negative electrode) or on the surface of the electrode.

The TFE polymer which can be used for the water-repelling agent of the present invention has non-fibril-forming property and must be excellent in water repellency, heat resistance and chemical resistance. Examples of the TFE polymer are, for instance, non-fibril-forming TFE polymers such as non-fibril-forming PTFE (homopolymer) and non-fibril-forming modified PTFE.

The above-mentioned non-fibril-forming modified PTFE encompasses a polymer obtained by copolymerizing other comonomer with TFE in such a small amount as not imparting melt-flowability. Examples of the other comonomer are hexafluoropropylene, chlorotrifluoroethylene, perfluoro(alkyl vinyl ether), perfluoro(alkoxy vinyl ether), trifluoroethylene, perfluoroalkylethylene and the like. An amount of the comonomer varies depending on its kind. For example, perfluoro(alkyl vinyl ether) or perfluoro(alkoxy vinyl ether) can be used as the copolymerizing component usually in an amount of up to 2% by weight, preferably from 0.01 to 1% by weight.

In addition to the above-mentioned TFE polymer, there can be used various copolymers such as TFE-perfluoro(alkyl vinyl ether) (PFAVE) copolymer (PFA) (provided that a copolymerizing amount of PFAVE exceeds 2% by weight), TFE-hexafluoropropylene (HFP) copolymer (FEP), TFE-PFAVE-HFP terpolymer (EPA) and TFE-HFP-vinylidene fluoride (VDF) terpolymer. Among them, PFA is preferable from the viewpoints of being difficult to melt by heating in production process of batteries and having high reliability against heating during use of batteries because of its relatively high melting point.

In the present invention, the above-mentioned non-fibril-forming TFE polymer and PFA can be used alone or in a mixture of two or more thereof.

In the above-mentioned water-repelling agent, the various copolymers other than the TFE polymer have no fibril-forming property inherently.

The fibril-forming property of the TFE polymer has relation with its average molecular weight. With respect to usual high molecular weight PTFE (homopolymer), its average molecular weight can be calculated by the conversion equation employing a standard specific gravity of molded articles (for example, the equation disclosed in JP-A-4-154842:

$$\log_{10}\overline{M}n = 31.83 - 11.58 \times SSG$$

wherein $\overline{M}n$ is a number average molecular weight, SSG represents a standard specific gravity stipulated in ASTM D-1457 83a).

However, in case of a low molecular weight PTFE (homopolymer), such measuring method cannot be applied. Also in case of the modified PTFE, it cannot be applied.

It is said that when the average molecular weight of the PTFE (homopolymer) is not more than 1,000,000, fibril-forming property is lost usually.

In the present invention, the fibril-forming property and average molecular weight of the PTFE and modified PTFE have been studied in detail, and as a result, a melt-viscosity having strong correlation with the average molecular weight is used as a yardstick for evaluation of the fibril-forming property.

The fibril-forming property is lost when the melt-viscosity at 380° C. is not more than $1 \times 10^7$ poises, preferably from $5 \times 10^2$ to $1 \times 10^6$ poises (the average molecular weight at $1 \times 10^7$ poises is estimated to be about $1,000,000 \pm 300,000$). When the melt-viscosity is less than $1 \times 10^2$ poises, heat resistance tends to be poor.

Existence of the fibril-forming property is evaluated by "paste extrusion" which is a typical method for molding "high molecular weight PTFE fine powder" which is a powder prepared by emulsion polymerization of TFE. Usually the reason why the paste extrusion is possible is that the high molecular weight PTFE has the fibril-forming property. If an unsintered molded rod obtained by the paste extrusion has neither substantial strength nor elongation, for example, if the elongation is 0% and the molded rod is broken when stretched, it can be regarded as having no fibril-forming property (namely, having non-fibril-forming property).

The water-repelling agent of the present invention is characterized by employing the non-fibril-forming TFE polymer (hereinafter also referred to simply as "polymer") and PFA as mentioned above, and further by employing the polymer and PFA for the agent after the particles of them are made into a liquid form such as an aqueous dispersion or organosol.

The average particle size of the above-mentioned fine particles must be sufficiently small. The smaller the average particle size is, the more the surface area per unit weight of the fine particles of the polymer and PFA increases, thereby enhancing water repellency of the electrode and making it easy to form the interface of three-phase. Also in view of uniform dispersing procedure, the smaller particle size is more advantageous. A proper average particle size is in a range of 0.05 to 1 μm. If the average particle size is larger than 1 μm, an adding amount of the particles must be increased for exhibiting water-repelling effect in the electrode, which not only is uneconomical but also lowers battery performance per unit capacity. If the average particle size is less than 0.05 μm, when the particles are made into a liquid form, its viscosity becomes too high and causes a problem from the viewpoint of its handling and it is difficult to industrially produce the polymer and PFA having such a small particle size (in consideration of economy for production in large scale). Therefore, preferable average particle size is from 0.05 to 0.3 μm, more preferably from 0.05 to 0.1 μm.

In the present invention, particularly the fine particles of the non-fibril-forming TFE polymer having an average particle size of from 0.05 to 0.3 μm and a melt-viscosity at 380° C. of not more than $1 \times 10^7$ poises, are excellent in productivity and can be uniformly dispersed on the surface of the electrode or inside thereof nearly in the form of fine particles.

The polymer and PFA forming fine particles having an average particle size of 0.05 to 1 μm can be prepared by usual emulsion polymerization processes. Among them, for example, non-fibril-forming PTFE can be prepared in accordance with the processes disclosed in, for example, JP-B-57-22043 and JP-B-51-25275. PFA can be prepared by the process disclosed in, for example, JP-B-48-20788. In those processes, an aqueous dispersion containing the fine particles can be obtained directly, and in general, a content of the fine particles in the aqueous dispersion is from 10 to 45% by weight. The fine particles having small average particle size can be produced easily by selecting kind and amount of the emulsifying agent used for the polymerization.

In the present invention, although the aqueous dispersion prepared by the emulsion polymerization can be used as it is for the water-repelling agent, there is a case where there arises a problem with respect to dispersion stability at the time of transportation and of operations such as condensation and mixing with the electrode materials. In such a case, it is preferable to adjust pH to alkali side of 7 to 11 and add a surfactant for stabilizing the dispersion.

Kind of the surfactant is not particularly limited. There can be used at least one of anionic, cationic and nonionic surfactants. Among those surfactants, there may be used the ionic surfactant having the same ion as a metal ion contained in an electrolyte (an aqueous solution of potassium hydroxide is mainly used for the nickel-metal hydride secondary battery) which is used for manufacturing a battery, but in general, the nonionic surfactant is preferred from a point that stability of the aqueous dispersion is excellent.

Kind of the nonionic surfactant is not particularly limited. Examples of the nonionic surfactant are a class of polyethylene glycol fatty acid ester surfactants, for instance, polyoxyethylene compounds such as glycol ester of fatty acid, fatty acid sorbitan and mannitol ester; and a class of polyoxyethylene condensate surfactants, for instance, polyoxyethylene condensates with higher fatty acid, higher alcohol, higher alkylamine, higher fatty acid amide, higher alkylmercaptan or alkylphenol. In addition, there may be used polyethyleneimine condensate surfactants.

In the present invention, although the nonionic surfactant may not be added, when it is added as the case demands, its adding amount may be, for example, from about 1% by weight to about 20% by weight on the basis of the total amount of fine particles of the copolymer and/or the polymer in the aqueous dispersion. If the amount is too small, there is a case where long-term dispersion stability is insufficient, and if too much, battery performance is adversely affected.

The above-mentioned surfactants are not essential for producing the battery of the present invention. Each electrode material may be admixed to the aqueous dispersion without adding the surfactant.

In the present invention, it is preferable that a concentration of fine particles of the PFA and/or the polymer in the aqueous dispersion is in the range of 1 to 70% by weight, more preferably 5 to 70% by weight, further preferably 5 to 60% by weight, particularly preferably 10 to 40% by weight, such a concentration being obtained by using the aqueous dispersion prepared through emulsion polymerization as it is or after diluting or concentrating. If the concentration is too high, a viscosity of the aqueous dispersion becomes high and workability becomes poor, and if the concentration is too low, it takes time and labor to remove moisture properly and productivity of the electrodes is lowered.

The organosol in the present invention containing the fine particles of the PFA and/or the polymer can be easily produced by separating the fine particles by coagulation through known method (cf., for example, Specification of U.S. Pat. No. 2,593,583) from the aqueous dispersion obtained through the emulsion polymerization, then drying the fine particles and re-dispersing the obtained powder in the dispersing medium mentioned later mechanically or by ultrasonic wave. Alternatively the organosol can be obtained without passing through the steps for forming a powder, by a phase inversion method as described in JP-B-49-17016.

In the organosol, it is difficult to obtain the fine particles of the PFA and the polymer in finely dispersed state like the aqueous dispersion, and the fine particles are agglomerated to some extent. Usually the agglomerated particles have a size of 1 to 5 μm. However, the agglomerated particles are those only agglomerated but not fused, and therefore, specific surface area thereof does not change substantially by the agglomeration. In this specification, the average particle size does not mean an average particle size of the agglomerated particles but means an average particle size of the fine particles.

The above-mentioned dispersing medium of the organosol is not particularly limited, and may be an organic dispersing medium capable of wetting the fine particles of the PFA and/or the polymer. Preferred are, for example, aromatic hydrocarbons such as benzene, toluene and xylene; halogenated hydrocarbons such as carbon tetrachloride and trichloroethylene; ketones such as methyl isobutyl ketone (MIBK) and diisobutyl ketone; esters such as butyl acetate; water-soluble alcohols such as methanol, ethanol and isopropanol (IPA); N-methylpyrrolidone (NMP); and the like. Particularly preferably usable organic dispersing medium is IPA, ethanol or MIBK in consideration of dispersibility of the fine particles, workability in producing the electrodes and toxicity.

In the organic dispersing mediums such as carbon tetrachloride, trichloroethylene and diisobutyl ketone which are difficult individually to wet the fine particles of the PFA and/or the polymer, it is possible to prepare the organosol by adding a small amount of an oil-soluble surfactant.

In cases where the electrode is subjected to water-repelling treatment by using the organosol, there are advantages that drying is easier as compared with the case of the aqueous dispersion and that such an adverse effect of the surfactant on the electrode as in the aqueous dispersion can be reduced.

In the present invention, it is preferable to use the fine particles of the PFA and/or the polymer in the organosol in a concentration ranging from 5 to 70% by weight, more preferably 5 to 40% by weight. If the concentration is too high, dispersibility becomes poor and it becomes difficult to obtain a uniform mixture of the fine particles and the electrode materials, and even if the mixture is applied, distribution of the electrode materials becomes non-uniform. If the concentration of fine particles is too low, the required amounts of the PFA and/or the polymer for exhibiting water repellency becomes difficult to obtain.

As the electrode materials such as the active material and electroconductive carbonaceous material which are used in the present invention, the above-mentioned conventional electrode materials can be used.

In order to endow the electrode with water-repelling property, as disclosed in, for example, JP-A-64-649, JP-A-3-102767 and JP-A-6-44490, the water-repelling agent of the present invention can be added at the time when mixing, to the electrode, an aqueous dispersion of a hydrophilic resin as a binder or thickener or a fibril-forming high molecular weight PTFE (homopolymer or modified PTFE) as a binder to make a paste. The fibrillation does not arise even by a strong shearing force when mixing the water-repelling agent of the present invention, thus not accompanying increase of the viscosity due to the fibrillation.

In such a case, it is preferable that the water-repelling agent of the present invention comprises an aqueous dispersion from a point of mixing easily uniformly to the above-mentioned electrode materials. Also the water-repelling agent of the present invention may be mixed after preparing a paste by mixing the electrode materials and the binder or the water-repelling agent can be impregnated in or applied to a current collector on which the paste has been applied.

The aqueous dispersion of the above-mentioned fibril-forming high molecular weight PTFE may be previously added to the aqueous dispersion containing the fine particles of the PFA and/or the polymer to prepare the water-repelling agent of the present invention.

When the water-repelling agent of the present invention is applied to the current collector coated with the paste which has been dried to a certain extent to decrease water content, it is possible to apply the water-repelling agent in the state of aqueous dispersion. However, it is preferable that the impregnation or application of the agent is carried out in the state of organosol, from a point that drying of an electrode sheet is easy.

In the present invention, when producing the negative electrode by using the electrode materials in the form of paste, the above-mentioned hydrophilic resin can be added. Examples of the hydrophilic resin are, for instance, hydrophilic acrylic polymers such as polyethylene glycol, polyethylene glycol-polypropylene glycol block copolymer, poly (vinyl alcohol), polyacrylic acid (including alkali metal salt and ammonium salt), polyacrylic acid-polymethacrylic acid copolymer (including metal salt and ammonium salt) and polyacrylamide; polyvinylpyrrolidone; hydrophilic celluloses such as carboxymethyl cellulose (CMC) and methyl cellulose (MC); natural hydrophilic high molecular compounds such as polysaccharide; and the like.

The above-mentioned hydrophilic resin may be added to the aqueous dispersion containing the fine particles of the PFA and/or the polymer, in which the nonionic surfactant is added previously, to prepare the water-repelling agent of the present invention. In that case, the amount of the nonionic surfactant is from 0 to 20% by weight, preferably from 0 to 10% by weight on the basis of the weight of the polymer or the PFA. The amount of the hydrophilic resin is from 0 to 10% by weight, preferably from 0 to 5% by weight on the basis of the weight of the polymer or the PFA.

Examples of the battery of the present invention are, for instance, lead storage battery, nickel-cadmium secondary battery, nickel-metal hydride secondary battery, lithium ion secondary battery, fuel cell and the like. For producing the electrode materials of the battery, the nickel-cadmium secondary battery and nickel-metal hydride secondary battery are preferable from the points that both states of aqueous dispersion and organosol can be employed and that performance of the battery can be more enhanced since the gas generation problem at the time of rapid over-charging can be dealt with quickly.

The battery of the present invention can be manufactured by, for example, methods mentioned below. (Production methods of negative electrode)

(1) The aqueous dispersion of the fibril-forming high molecular weight PTFE (binder), active material and electroconductive carbonaceous material are uniformly mixed. After applied to a current collector and dried, the mixture is then impregnated with the water-repelling agent of the present invention comprising the organosol.

(2) The aqueous dispersion of the high molecular weight PTFE, active material, electroconductive carbonaceous material and water-repelling agent of the present invention in the state of aqueous dispersion are uniformly mixed, and the mixture is applied to a current collector.

(3) The aqueous dispersion of the high molecular weight PTFE, active material, thickener, electroconductive carbonaceous material and water-repelling agent of the present invention in the state of aqueous dispersion are uniformly mixed, and the mixture is applied to a current collector.

(4) The aqueous dispersion of the high molecular weight PTFE, active material, thickener and electroconductive carbonaceous material are uniformly mixed, and then the mixture is applied to a current collector and dried. Then the water-repelling agent of the present invention in the state of organosol is applied thereto.

In each of the above-mentioned production methods, further drying and pressing follow to fibrillate the high molecular weight PTFE, and then pressing by rollers follows to give the electrode having a uniform thickness.
(Production Method of Positive Electrode)

A foamed metal is filled with nickel hydroxide.
(Fabrication Method of Battery)

A separator made of a non-woven polyamide fabric is provided between the positive electrode and the negative electrode which are produced by the above-mentioned methods, and the whole is wound into a whirlpool and put in a nickel-plated container having a size of AA type battery. Then an aqueous solution of electrolyte is put therein and a cover is placed thereon.

As the water-repelling agent for batteries of the present invention, preferred are, for example, those mentioned below.

(1)

| (A) Fine particles | |
| --- | --- |
| Kind | PFA |
| Average particle size | 0.05 to 1 μm |
| (B) Dispersing medium | |
| Kind | Water or organic dispersing medium |

This agent is advantageous from the viewpoint of water repellency.
More preferably,

| (A1) Fine particles | |
| --- | --- |
| Kind | PFA |
| Average particle size | 0.05 to 0.1 μm |
| (B) Dispersing medium | |
| Kind | Water or organic dispersing medium |

This agent is excellent from a point that since the particle size is smaller, more number of interfaces of three-phase can be formed even if the amount to be used is the same.
Further preferably,

| (A2) Fine particles | |
| --- | --- |
| Kind | PFA |
| Average particle size | 0.05 to 0.1 μm |
| Content in the dispersing medium | 1 to 70% by weight |
| (B) Dispersing medium | |
| Kind | Water or organic dispersing medium |

This agent is excellent from a point that handling property is good when using in a proper amount in the dispersing medium.

(2)

| (A1) Fine particles | |
| --- | --- |
| Kind | Non-fibril-forming TFE polymer |
| Average particle size | 0.05 to 1 μm |
| (B) Dispersing medium | |
| Kind | Water or organic dispersing medium |

This agent is advantageous from the viewpoint of water repellency.
More preferably,

| (A2) Fine particles | |
| --- | --- |
| Kind | Non-fibril-forming TFE polymer |
| Average particle size | 0.05 to 0.3 μm |
| Melt-viscosity | Not more than $1 \times 10^7$ poises |
| (B) Dispersing medium | |
| Kind | Water or organic dispersing medium |

This agent is excellent from a point that since the particle size is smaller, more number of interfaces of three-phase can be formed.
Further preferably,

| (A3) Fine particles | |
| --- | --- |
| Kind | Non-fibril-forming TFE polymer |
| Average particle size | 0.05 to 0.3 μm |
| Melt-viscosity | Not more than $1 \times 10^7$ poises |
| Content in the dispersing medium | 1 to 70% by weight |
| (B) Dispersing medium | |
| Kind | Water or organic dispersing medium |

This agent is excellent from a point that handling property is good when using in a proper amount in the dispersing medium.

The present invention is then explained concretely by means of Preparation Examples and Examples, but the present invention is not limited to them. In Preparation Examples and Examples, methods of tests are mentioned below.

Measurement of Average Particle Size of Fine Particles

A photograph of ×20000 is obtained with a scanning electron microscope (model S-4000 available from Hitachi Seisakusho) at an acceleration voltage of 3 to 5 KV and then with respect to about 100 particles of the fine particles, particle sizes of a given direction were measured to obtain an average particle size.

Paste Extrusion Test

An amount of 10.8 g of an auxiliary solvent for extrusion (trade name IP1620 available from Idemitsu Sekiyu Kagaku Kabushiki Kaisha) which is a hydrocarbon oil is mixed with 50 g of a powder of the TFE polymer or PFA, and the mixture is allowed to stand at room temperature (25±2° C.) for eight hours to make them both compatible with each other. Then an extrusion die which is provided with a cylinder (inner diameter: 25.4 mm) and an orifice having a throttle angle of 30 degrees, inner diameter of 2.54 mm and a land length of 7 mm is charged with the obtained mixture and a load of 60 kg is applied to a piston inserted in the cylinder, followed by holding for one minute. Immediately after that, the mixture is extruded into a form of string at a ram speed of 20 mm/minute (push down speed of the piston) at room temperature. In case where a continuous extrudate is obtained, a tensile test is carried out at a tensile rate of 200 mm/minute at room temperature.

Measurement of Contact Angle of Water

A contact angle of water on a surface of an electrode is measured with a contact angle measuring meter available from Kyowa Kaimen Kagaku Kabushiki Kaisha.

Melt-viscosity

A Koka-type flow tester available from Shimadzu Corporation is used. A cylinder having an inner diameter of 11.3 mm is charged with 2.0 g of a powder of the TFE polymer or PFA, followed by holding at 380° C. for five minutes. Then a load (7 or 32 kg) is applied to a piston to carry out extrusion through an orifice having an inner diameter (2R) of 2.1 mm and a length (L) of 8 mm. An extruded amount (Q:cm²/sec) is measured. The melt-viscosity η is calculated by the following equation.

$$\eta(\text{poise}) = \Delta P \cdot 2R \cdot \pi \cdot R^3 / 16 \cdot L \cdot Q$$

wherein ΔP represents a load (dyne).

PREPARATION EXAMPLE 1

A six-liter autoclave made of stainless steel (SUS 316) and equipped with an anchor type stainless agitation blade and a jacket for temperature adjustment was charged with 2,960 ml of deionized water, 9.0 g of $C_3F_7OCF(CF_3)CF_2OCF(CF_3)COONH_4$ and further 120 g of paraffin wax (available from Nippon Sekiyu Kabushiki Kaisha) as an emulsification stabilizer, followed by replacement of oxygen in the system with nitrogen gas three times and with TFE twice. An internal pressure of the autoclave was adjusted to 1.0 MPa with TFE, and an inside temperature was maintained at 70° C. with agitating at 250 rpm.

Then, 40 ml of an aqueous solution, in which ethane corresponding to 130 cc at normal pressure as a chain transfer agent, 15.0 g of perfluoro(propyl vinyl ether) as copolymer and 300 mg of ammonium persulfate as a polymerization initiator had been dissolved, was introduced into the system to start a reaction. During the reaction, the temperature and agitation in the system were kept at 70° C. and at 250 rpm, respectively. TFE was supplied continuously so that the temperature inside the autoclave was always maintained at 1.0±0.05 MPa.

At the time when 530 g of TFE was consumed after the addition of the initiator, supplying of TFE and agitating were stopped, and TFE in the autoclave was discharged until the inside of the autoclave reached normal pressure to stop the reaction. The total reaction time was six hours, and a solid content (nearly equal to a content of PFA) obtained by evaporating a part of the obtained aqueous dispersion to dryness was 15.0% by weight. An average particle size of fine particles of PFA measured with an electron microscopic photograph was 0.08 μm.

Ammonium carbonate was added as a coagulant to a part of the obtained aqueous dispersion, and coagulation was carried out with agitating, further followed by washing and then drying at 130° C. for 16 hours to give a powder.

By using a part of the dried powder, a melt-viscosity was measured and the paste extrusion was carried out. The melt-viscosity was $1.5 \times 10^4$ poises. The extrudates obtained were only those which were not continuous, and it was clear that the extrudates have neither strength nor elongation due to fibrillation.

A content of perfluoro(propyl vinyl ether) in the copolymer was measured in accordance with the method described in JP-A-60-240713 and was 2.5% by weight.

Then an organosol of the obtained powder (hereinafter referred to as "Organosol 1") was prepared by using isopropanol as a dispersing medium. The organosol was prepared by adding the powder in an amount of 10 parts by weight on the basis of 100 parts by weight of isopropanol and irradiating ultrasonic wave of 20 KHz×100 W for 30 minutes. A part of the organosol was dried at room temperature and observed with an electron microscope. As a result, a particle of about 3 μm formed through agglomeration of fine particles was observed. However an average particle size of the constituent fine particles was 0.08 μm which was the same as that of fine particles in the aqueous dispersion which were obtained just after the polymerization.

On the other hand, to the remaining aqueous dispersion were added 6.0% by weight of Triton X-100 (available from Rhom & Haas Company) as a nonionic surfactant on the basis of a weight of the copolymer contained, followed by adjusting pH to 9.0 with aqueous ammonia. Then water was evaporated under reduced pressure to condensate the dispersion so that a PFA solid content would be 60% by weight. An average particle size of fine particles of PFA in the condensated aqueous dispersion (hereinafter referred to as "Aqueous Dispersion 1") which was measured with an electron microscopic photograph was 0.08 μm which was the same as that of the original aqueous dispersion.

PREPARATION EXAMPLE 2

A six-liter autoclave made of stainless steel (SUS 316) and equipped with an anchor type stainless agitation blade and a jacket for temperature adjustment was charged with 2,960 ml of deionized water, 3.0 g of perfluorooctanoic acid ammonium salt and further 120 g of paraffin wax (available from Nippon Sekiyu Kabushiki Kaisha) as an emulsification stabilizer, followed by replacement of oxygen in the system with nitrogen gas three times and with TFE twice. An internal pressure of the autoclave was adjusted to 1.0 MPa with TFE, and an inside temperature was maintained at 70° C. with agitating at 250 rpm.

Then, 20 ml of an aqueous solution, in which ethane corresponding to 150 cc at normal pressure as a chain transfer agent and 300 mg of ammonium persulfate as an polymerization initiator had been dissolved, was introduced into the system to start a reaction. During the reaction, the temperature and agitation in the system were kept at 70° C. and at 250 rpm, respectively. TFE was supplied continuously so that the temperature inside the autoclave was always maintained at 1.0±0.05 MPa.

At the time when 1,000 g of TFE was consumed after the addition of the initiator, supplying of TFE and agitating were stopped, and TFE in the autoclave was discharged until the inside of the autoclave reached normal pressure to stop the reaction. The total reaction time was nine hours, and a solid content (nearly equal to a content of TFE polymer) obtained by evaporating a part of the obtained aqueous dispersion to dryness was 25.0% by weight. An average particle size of fine particles of the TFE polymer measured with an electron microscopic photograph was 0.22 μm.

A powder was prepared in the same procedure as in Preparation Example 1. A melt-viscosity measured was $2 \times 10^5$ poises.

By using a part of the dried powder, paste extrusion was carried out. The extrudates obtained were only those which were not continuous, and it was clear that the extrudates have neither strength nor elongation due to fibrillation.

Then an organosol of the obtained powder (hereinafter referred to as "Organosol 2") was prepared by using MIBK. The powder was added in an amount of 10 parts by weight on the basis of 100 parts by weight of MIBK, and ultrasonic wave of 20 KHz×100 W was irradiated for 30 minutes. A particle formed through agglomeration of fine particles was observed with an electron microscope in the same manner as in Organosol 1 obtained in Preparation Example 1 and an average particle size of the constituent fine particles was 0.22 μm which was the same as that of fine particles in the aqueous dispersion which were obtained just after the polymerization.

On the other hand, to the remaining aqueous dispersion were added 6.0% by weight of Triton X-100 (available from Rhom & Haas Company) as a nonionic surfactant on the basis of a weight of the TFE polymer contained, followed by adjusting pH to 9.0 with aqueous ammonia. Then water was evaporated under reduced pressure to condensate the dispersion so that a solid content of the TFE polymer would be 60% by weight. An average particle size of fine particles of the TFE polymer in the condensated aqueous dispersion (hereinafter referred to as "Aqueous Dispersion 2") which was measured with an electron microscopic photograph was 0.22 μm which was the same as that of the original aqueous dispersion.

PREPARATION EXAMPLE 3

An aqueous dispersion was prepared in the same manner as in Preparation Example 2 except that supplying of TFE and agitating were stopped when the consumed TFE reached 500 g. A solid content of the obtained aqueous dispersion was 14.3% by weight, and an average particle size of fine particles of the polymer measured with an electron microscopic photograph was 0.12 μm. A melt-viscosity was $1\times10^5$ poises. By using a part of the dried powder, paste extrusion was carried out. Like the PFA or the polymer obtained in Preparation Example 1 or 2, only extrudates which were not continuous could be obtained and there were neither strength nor elongation due to fibrillation.

A part of the aqueous dispersion was condensated in the same manner as in Preparation Example 1 or 2 to give an aqueous dispersion (hereinafter referred to as "Aqueous Dispersion 3") condensated so that a solid content of the polymer would be 60% by weight. An average particle size of fine particles of the polymer in Aqueous Dispersion 3, which was measured with an electron microscopic photograph, was 0.12 μm which was the same as that of the original aqueous dispersion.

On the other hand, to the remaining aqueous dispersion were added 0.1% by weight of Triton X-100 (available from Rhom & Haas Company) as a nonionic surfactant on the basis of a weight of the polymer in the aqueous dispersion, followed by adjusting pH to 9.0 with aqueous ammonia. Then ion exchange water was added so that a solid content in the aqueous dispersion would be 10% by weight, and thus an aqueous dispersion (hereinafter referred to as "Aqueous Dispersion 4") was obtained. An average particle size of fine particles of the polymer in Aqueous Dispersion 4, which was measured with an electron microscopic photograph, was 0.12 μm which was the same as that of the original aqueous dispersion.

EXAMPLE 1

A commercially available PTFE aqueous dispersion (D-1 available from Daikin Industries, Ltd., polymer content: 60% by weight, melt-viscosity: $1\times10^{11}$ poises, average molecular weight: about 3,000,000) was mixed to 100 parts by weight of a hydrogen storage alloy having an average particle size of 32 μm ($MmNi_{3.5}Al_{0.5}Co_{0.7}Mn_{0.3}$ available from Santoku Kinzoku Kogyo Kabushiki Kaisha) so that the polymer content would be 20 parts by weight. The mixing was continued for 20 minutes at 10,000 rpm by a homogenizer with cooling with ice water to give a paste. The paste was applied on an aluminium foil by a roller, and dried at room temperature and then at 80° C. A contact angle of water on a surface of the so-produced electrode was 48 degrees.

The electrode was dipped in Organosol 1 or 2 prepared in Preparation Example 1 or 2 and then dried. An impregnated amount of PFA or the polymer in the electrode was about 5 parts by weight. A contact angle of water on the surface of the dried electrode was 120 degrees when Organosol 1 was used and 115 degrees when Organosol 2 was used.

EXAMPLE 2

The same commercially available PTFE aqueous dispersion as in Example 1 was mixed to 100 parts by weight of the hydrogen storage alloy used in Example 1 so that the polymer content would be 10 parts by weight. Further thereto was added an Aqueous Dispersion 1 or 2 prepared in Preparation Example 1 or 2 (polymer content: 60% by weight). The mixing was carried out for 20 minutes at 10,000 rpm by a homogenizer with cooling with ice water to give a paste. The paste was applied on an aluminium foil by a roller, and dried at room temperature and then at 80° C. A contact angle of water on a surface of the so-obtained electrode was 59 degrees when Aqueous Dispersion 1 was used and 56 degrees when Aqueous Dispersion 2 was used. Thus the contact angles were larger than 48 degrees which was the contact angle of water before dipping into the organosol in Example 1. Namely, water-repelling effect was excellent when 10 parts by weight of the fibril-forming PTFE and 10 parts by weight of the non-fibril-forming TFE were used together in comparison with when 20 parts by weight of the fibril-forming PTFE was used.

COMPARATIVE EXAMPLE 1

The same procedures as in Example 1 were repeated except that only 20 parts by weight of Aqueous Dispersion 1 obtained in Preparation Example 1 was used instead of the commercially available PTFE aqueous dispersion and admixed to 100 parts by weight of the hydrogen occlusion alloy. However, the paste could not be obtained due to too low viscosity. The same result was obtained even when Aqueous Dispersion 2 prepared in Preparation Example 2 was used.

EXAMPLE 3

A commercially available PTFE aqueous dispersion (D-1 available from Daikin Industries, Ltd., polymer content: 60% by weight, average molecular weight: about 3,000,000) which was diluted to 10% by weight was added to a hydrogen storage alloy having an average particle size of 32 μm ($MmNi_{3.5}Al_{0.5}Co_{0.7}Mn_{0.3}$ available from Santoku Kinzoku Kogyo Kabushiki Kaisha) so that a solid content of the polymer would be 2% by weight on the basis of the hydrogen storage alloy. Then Aqueous Dispersion 1 prepared in Preparation Example 1 was diluted to 10% by weight and added so that a solid content of the TFE polymer would be 2% by weight on the basis of the hydrogen storage alloy. Further 5% by weight of an aqueous solution of polyvinyl alcohol was added as a thickener so that polyvinyl alcohol would be 0.5% by weight on the basis of the hydrogen storage alloy, and a fine powder of carbon as an electroconductive carbonaceous material was added so as to be 5% by weight on the basis of the hydrogen storage alloy, followed by kneading to give a paste.

The paste was applied to a nickel-plated punching metal and smoothed with a slit to give an electrode. The electrode was pressed with a five-ton press and further passed through a roller press to be adjusted to a given thickness, followed by drying at 100° C. for two hours, and then cutting. Lead plates were mounted by spot welding to give an electrode (hereinafter referred to as "Electrode A").

As an opposite electrode (positive electrode), a known foamed nickel electrode produced by filling a foamed metal with nickel hydroxide was used. As a separator, a polyamide non-woven fabric commercially available was used.

The separator was provided between Electrode A and the positive electrode, and the whole was wound into a whirlpool and put in a nickel-plated container having a size of AA type battery. After filling with an aqueous solution of potassium hydroxide having a specific gravity of 1.30, a cover was put on the container, and thus a closed type cylindrical battery (hereinafter referred to as "Battery A") having a rated capacity of 1,200 mAh was produced.

EXAMPLE 4

An electrode (hereinafter referred to as "Electrode B") was produced in the same manner as in Example 3 except that Aqueous Dispersion 2 prepared in Preparation Example 2 was used instead of Aqueous Dispersion 1, and a battery (hereinafter referred to as "Battery B") was then produced.

COMPARATIVE EXAMPLE 2

An electrode (hereinafter referred to as "Electrode C") was produced in the same manner as in Example 3 except that a commercially available PTFE aqueous dispersion (D-1 available from Daikin Industries, Ltd., polymer content: 60% by weight, average molecular weight: about 3,000,000) was used instead of Aqueous Dispersion 1, and a battery (hereinafter referred to as "Battery C") was then produced.

EXAMPLE 5

A commercially available PTFE aqueous dispersion (D-1 available from Daikin Industries, Ltd., polymer content: 60% by weight, average molecular weight: about 3,000,000) which was diluted to 10% by weight was added to a hydrogen storage alloy having an average particle size of 32 $\mu$m (MmNi$_{3.5}$Al$_{0.5}$Co$_{0.7}$Mn$_{0.3}$ available from Santoku Kinzoku Kogyo Kabushiki Kaisha) so that a solid content of the polymer would be 4% by weight on the basis of the hydrogen storage alloy. Then 5% by weight of an aqueous solution of polyvinyl alcohol was added as a thickener so that polyvinyl alcohol would be 0.5% by weight on the basis of the hydrogen storage alloy, and a fine powder of carbon as an electroconductive carbonaceous material was added so as to be 5% by weight on the basis of the hydrogen storage alloy, followed by kneading to give a paste.

The paste was applied to a nickel-plated punching metal and smoothed with a slit to give an electrode. The electrode was pressed with a five-ton press and further passed through a roller press to be adjusted to a given thickness. Afterwards, 0.4 to 0.5 mg/cm$^2$ of Organosol 1 prepared in Preparation Example 1 was applied on a surface of the electrode, followed by drying at 100° C. for five hours, and then cutting. Lead plates were mounted by spot welding to give an electrode (hereinafter referred to as "Electrode D").

As an opposite electrode (positive electrode), a known foamed nickel electrode produced by filling a foamed metal with nickel hydroxide was used. As a separator, a polyamide non-woven fabric commercially available was used.

The separator was provided between the Electrode D and the positive electrode, and the whole was wound into a whirlpool and put in a nickel-plated container having a size of AA type battery. After filling with an aqueous solution of potassium hydroxide having a specific gravity of 1.30, a cover was put on the container, and thus a closed type cylindrical battery (hereinafter referred to as "Battery D") having a rated capacity of 1,200 mAh was produced.

EXAMPLE 6

An electrode (hereinafter referred to as "Electrode E") was produced in the same manner as in Example 5 except that Organosol 2 prepared in Preparation Example 2 was used instead of Organosol 1, and a battery (hereinafter referred to as "Battery E") was then produced.

EXAMPLE 7

An electrode (hereinafter referred to as "Electrode F") was produced in the same manner as in Example 3 except that Aqueous Dispersion 3 prepared in Preparation Example 3 was used instead of Aqueous Dispersion 1, and a battery (hereinafter referred to as "Battery F") was then produced.

EXAMPLE 8

An electrode (hereinafter referred to as "Electrode G") was produced in the same manner as in Example 3 except that Aqueous Dispersion 4 prepared in Preparation Example 3 was used instead of Aqueous Dispersion 1, and a battery (hereinafter referred to as "Battery G") was then produced.

The thus produced Batteries A to G were charged at 0.1 C. current at 20° C. for 15 hours and then discharged at 0.2 C. current. When a voltage of the battery became 1.0 V, the discharging was stopped. Under such cycle conditions, charging and discharging were repeated to measure discharge capacity as battery performance. Cycle characteristics of the discharge capacity are shown in FIG. 1 provided that initial discharge capacity is 100.

In FIG. 1, A represents the cycle characteristic of the battery produced in Example 3, B represents the cycle characteristic of the battery produced in Example 4, C represents the cycle characteristic of the battery produced in Comparative Example 2, D represents the cycle characteristic of the battery produced in Example 5, E represents the cycle characteristic of the battery produced in Example 6, F represents the cycle characteristic of the battery produced in Example 7, and G represents the cycle characteristic of the battery produced in Example 8.

As it is clear from FIG. 1, the cycle lives of Batteries A, B, D, E, F and G in which the aqueous dispersions or organosols prepared in Preparation Examples 1, 2 and 3 were used are enhanced as compared with Battery C in which such a dispersion or organosol was not used.

It is considered that this is because the low molecular weight PTFE or PFA exists on the surface of or inside the electrode without fibrillation to produce more number of interfaces of three-phase whereby the oxygen gas generated from the positive electrode when charging can be readily diffused, absorbed and reacted.

Then the internal pressure characteristics of Batteries A to G were evaluated. Charging was carried out at 20° C. at 0.1 C. current for 15 hours, and the internal pressure at that time was measured by previously drilling a hole on the bottom of the battery and setting the battery on a fixed device equipped with a pressure sensor. Discharging was carried out at 0.2 C. current until reaching 1.0 V. Maximum internal pressure of the battery at the 100th cycle is shown in Table 1.

TABLE 1

| Battery | No. of Aqueous Dispersion or Organosol used | Average particle size of primary particle of the polymer or copolymer ($\mu$m) | Maximum internal pressure of battery at 100th cycle (kg/cm$^2$G) |
|---|---|---|---|
| A | Aqueous Dispersion 1 | 0.08 | 5.4 |
| B | Aqueous Dispersion 2 | 0.22 | 6.2 |
| C | (Commercially available one) | 0.27 | 10.5 |
| D | Organosol 1 | 0.08 | 6.5 |
| E | Organosol 2 | 0.22 | 6.8 |
| F | Aqueous Dispersion 3 | 0.12 | 5.6 |
| G | Aqueous Dispersion 4 | 0.12 | 5.0 |

As it is clear from the results shown in Table 1, the internal pressures of Batteries A, B, D, E and F are lower than that of Battery C and this indicates that oxygen gas actually generated were absorbed quickly. Further when comparing Batteries A, B and F, it is known that the smaller the average particle size of the polymer or PFA is, the better the battery performance measured is. It is considered this is because the smaller the particle size is, the more efficiently the interfaces of three-phase are dispersed on the surface of or inside the electrode. When comparing F with G, the internal pressure of G is lower than that of F. It is presumed this suggests that G containing smaller amount of surfactant exhibits a higher effect of the water-repelling agent. It is very important that the internal pressure of the battery should be kept at a low level from safety point of view.

INDUSTRIAL APPLICABILITY

The water-repelling agent for batteries of the present invention is very excellent in water repellency and has good workability, heat resistance and chemical resistance. The batteries produced by using the water-repelling agent are excellent in cycle life and internal pressure characteristics.

What is claimed is:

1. A battery comprising a positive electrode and a negative electrode, at least one of said electrodes comprising a water-repelling agent, wherein the water-repelling agent comprises fine particles which have an average particle size of 0.05 to 1 $\mu$m and which are selected from the group consisting of tetrafluoroethylene-perfluoro(alkyl vinyl ether) copolymer particles; non-fibril-forming polytetrafluoroethylene particles and mixtures thereof.

2. The battery of claim 1, wherein the non-fibril-forming tetrafluoroethylene polymer has a melt-viscosity of not more than 1×10$^7$ poises at 380° C. and an average particle size of its fine particles is from 0.05 to 0.3 $\mu$m.

3. The battery of claim 1, wherein an average particle size of fine particles of the tetrafluoroethylene-perfluoro(alkyl vinyl ether) copolymer and/or the non-fibril-forming tetrafluoroethylene polymer is from 0.05 to 0.1 $\mu$m.

4. The battery of claim 1, wherein the water-repelling agent is an aqueous dispersion containing 1 to 70% by weight of the copolymer and/or the polymer.

5. The battery of claim 4, wherein the aqueous dispersion contains a nonionic surfactant in an amount of 0 to 20% by weight on the basis of the weight of the fine particles of the copolymer and/or the polymer.

6. The battery of claim 1, wherein the water-repelling agent is an organosol containing 5 to 70% by weight of the copolymer and/or the polymer.

7. The battery of claim 6, wherein the organosol contains a dispersing medium which is isopropanol, ethanol or methyl isobutyl ketone.

8. The battery of claim 1, wherein the battery is a nickel-cadmium secondary battery or a nickel-metal hydride secondary battery.

9. The battery of claim 1, wherein said at least one electrode further comprises a fibril-forming high molecular weight tetrafluoroethylene polymer, which is added as particles independent of the water-repelling agent.

* * * * *